United States Patent [19]

Fife et al.

[11] Patent Number: 5,000,116
[45] Date of Patent: Mar. 19, 1991

[54] SELF-COVERING PET BED

[76] Inventors: Lois A. Fife; Blaine C. Fife; Stefanie Fife, all of 16063 Osborne St., Sepulveda, Calif. 91343

[21] Appl. No.: 494,136

[22] Filed: Mar. 14, 1990

[51] Int. Cl.$^5$ ............................................. A01K 29/00
[52] U.S. Cl. ..................................... 119/28.5; 119/15
[58] Field of Search ............... 119/1, 15, 19; D30/118

[56] References Cited

U.S. PATENT DOCUMENTS

| D. 256,734 | 9/1980 | Riley | D30/6 |
|---|---|---|---|
| D. 289,699 | 5/1987 | Runion | D30/41 |
| D. 294,752 | 3/1988 | Palier | D30/118 |
| D. 299,769 | 2/1989 | James | D30/119 |
| 2,775,222 | 12/1956 | Kruck | 119/1 |
| 3,814,058 | 6/1974 | Thompson | 119/19 |
| 3,989,008 | 11/1976 | Neumann | 119/1 |
| 4,008,687 | 2/1977 | Keys | 119/1 |
| 4,008,688 | 2/1977 | Nicholas | 119/1 |
| 4,064,835 | 12/1977 | Rabenbauer | 119/1 |
| 4,169,428 | 10/1979 | Waugh | 119/1 |
| 4,539,935 | 9/1985 | Meyer | 119/1 |
| 4,893,586 | 1/1990 | Carson | 119/1 |

Primary Examiner—John G. Weiss

[57] ABSTRACT

A dual purpose sleeping apparatus which allows a pet to sleep on top (20) of the pet bed, or to climb inside and be directly covered. It consists of a top (20), ribbed sides (30) which allow telescoping action as the pet enters and exits, and a cushion base (40). When the bed is not in use it gives the appearance of a typical pet bed mat due to the action of the ribs (30) and the top (20) framing material (70). As the rib (30) collapses, the rib insert(s) (32) position(s) the top (20) over the base (40). The framing material (70) around the perimeter of the top (20) serves to keep the edges spread over the base (40).

1 Claim, 3 Drawing Sheets

SELF-COVERING PET BED

BACKGROUND—FIELD OF INVENTION

This invention relates to dual purpose pet beds, specifically to pet beds which may be used as traditional pet mats and also allow pets to cover themselves.

BACKGROUND—DESCRIPTION OF PRIOR ART

This invention allows a pet to get inside the pet bed and be covered or to use it as a traditional pet mat by lying on top. The invention came about as a result of observing our dog get into our beds, unmake covers, and burrough under blankets whenever she could. We bought a child size sleeping bag which our dog soon claimed as her own, but she was unable to burrough into it unless it was arranged for her. Also, our dog pulled the child sized sleeping bag thoughout the room when exiting. Therefore, the sleeping bag was seldom neat appearing.

Pet sleeping bag, U.S. Pat. No. 4,169,428, by Waugh, Oct. 1979 resembles the child sized sleeping bag which our dog used. The child sized sleeping bag was not stable enough for our pet to use without assistance. The pet could not find the entry unless the bag was straightened out.

Other prior art seems to have focused on pads or mats where the pet lies on the surface, and foam rubber constructed structures. The later does not directly cover the pet as a blanket would and is often clumsy in appearance. Other variations include filling the mat with specialty products such a cedar chips, or using lambs wool for the covering. One bed bed was raised off the floor by use of a frame and advertised for arthritic dogs. Prior art, U.S. Pat. No. 3,814,058 by Thompson, Jun. 4, 1974 allows the pet to enter the structure, but serves as a house-like structure on a frame. U.S. Pat. No., Des. 299,769 by James, Feb. 7, 1989 is shaped as a shoe which allows the animal to climb inside, but likewise, provides no blanket-type covering.

We found that our pet uses the prototype we built frequently throughout the the day since the self-covering pet bed maintains its form and requires no assistance to enter.

In general, prior art does not lend itself for dual purpose as the self-covering pet bed does. The self-covering pet bed is an attractive addition to any room since it appears to be a pillow-like mat when not in use.

OBJECTS AND ADVANTAGES

Briefly then, the self-covering pet bed, designed to provide a sleeping apparatus primarily for household pets fulfills several objects and advantages:
(a) Provides warmth for pets when thermostats are turned down and the pet seeks warmth;
(b) Provides a den-like area where a pet can be alone and feel secure;
(c) Provides a sleeping area where the pet can burrough under the covers or use as a mat;
(d) Provides a portable pet bed;
(e) Provides a pet bed which has no rigid sides to scuff furniture or walls;
(f) Provides a pet bed which stores in small areas;
(g) Provides a pet bed which is 100% washable and readily dryable;
(h) Provides a pet bed with dual purpose which has decorative appeal and remains neat in appearance.

DRAWING FIGURES

In the drawings, closely related figures have the same number but different alphabetic suffixes.

FIG. 1a. shows the front side of the bed in an expanded view as it would be when raised by the animal upon entering.

FIG. 1b. shows the back side of FIG. 1a as it would be when raised by the animal upon entering FIG. 1c. shows the pet bed as it would appear when not occupied by the pet FIGS. 2a. to 2c. show required components of self-covering pet bed.

FIGS. 2d. to 2e. shows preferred addition of mini rib and sham base to allow insertion of base insert.

FIG. 3b illustrates the back side of FIG. 3a.

REFERENCE NUMERALS IN DRAWINGS

Figure 1A:
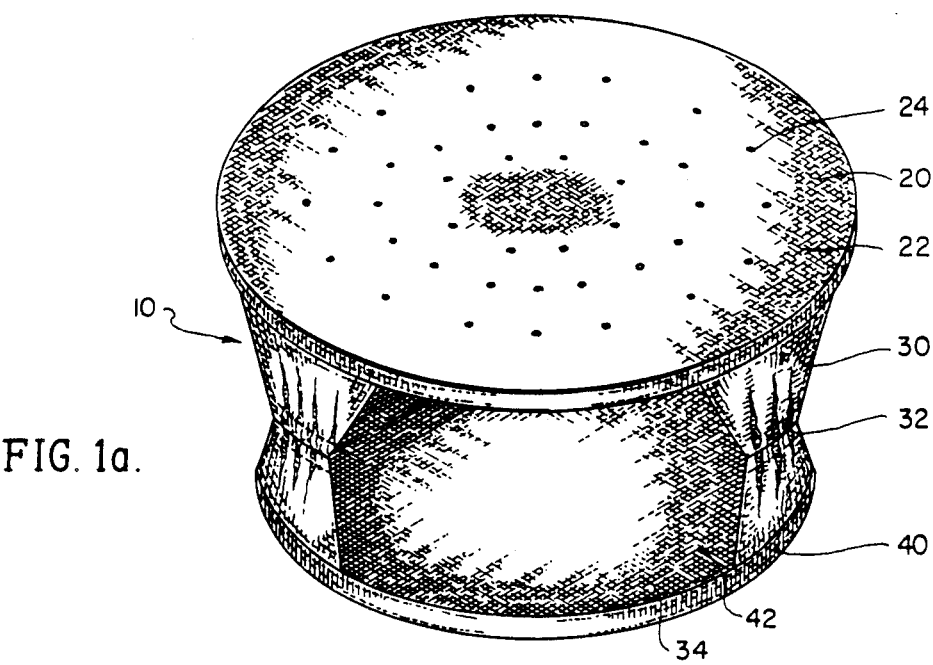

10 Self-Covering Pet Bed
20 Top
22 Multiple ply quilted fabric
24 Sewing
30 Rib
32 Rib inserts
34 Entry
36 Bed vents
38 Casing
40 Cushion pad
42 Double multiple ply quilted fabric
50 Sham
52 Mini-rib
54 Sham base
56 Sham opening
58 Closure devise
60 Base insert
70 Top framing

DESCRIPTION—FIGS. 1a To 3c

Figure 1B:
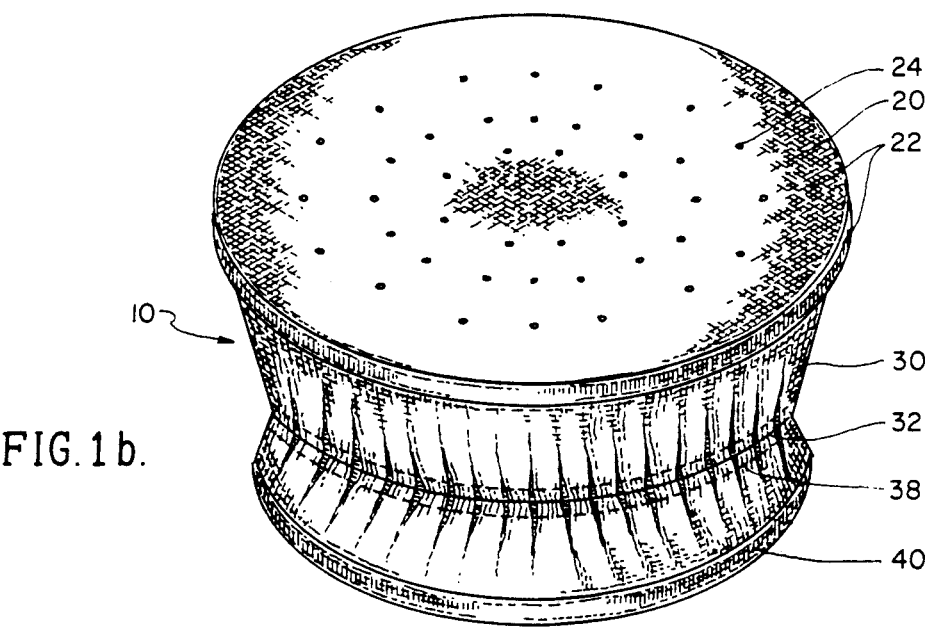
Figure 1C:
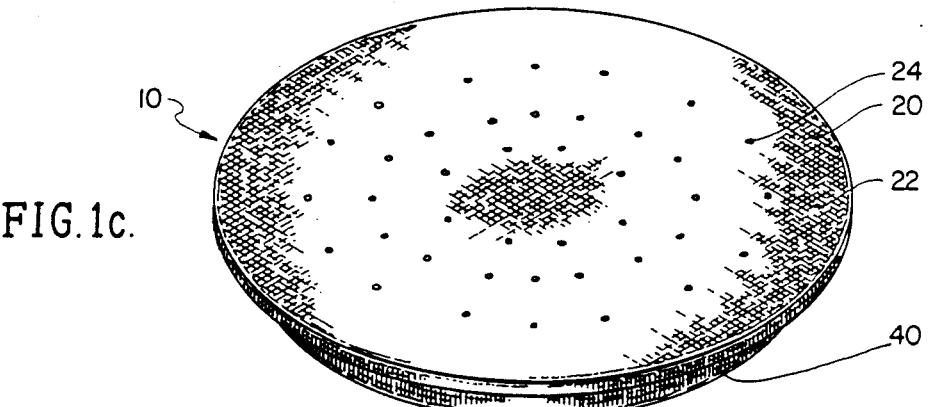

FIG. 1a through FIG. 1c illustrate three views of the self-covering pet bed (10).

FIG. 1a. is the front expanded view of the invention, illustrating how it would appear after a pet has entered the devise, but prior to the pet laying down. It consists of a multiple ply padded fabric top (20), a fabric rib (30) which is flexible to allow easy entry (34) for the pet, and a multiple ply padded fabric cushioning pad (40) for the pet to lay on, whereby the top (20) causes self covering as the animal positions itself to lay down, and rib (30) sags for direct covering over the pet when in a resting position.

FIG. 1b. Illustrates the back view of the self-covering pet bed (10) as shown in FIG. 1a. Rib inserts (32) cause the top (20) to position over the pad (40) when the ribs (30) are in a relaxed position.

FIG. 1c. Illustrates the position of the top (20) ready for the pet to use as a bed mat. The ribs (30) are in a relaxed position. There is no distinction between the front and the back views.

Figure 2A:
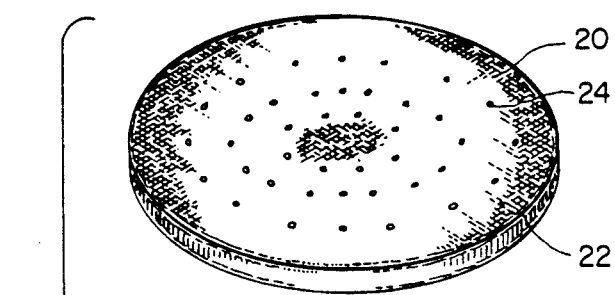
Figure 2B:
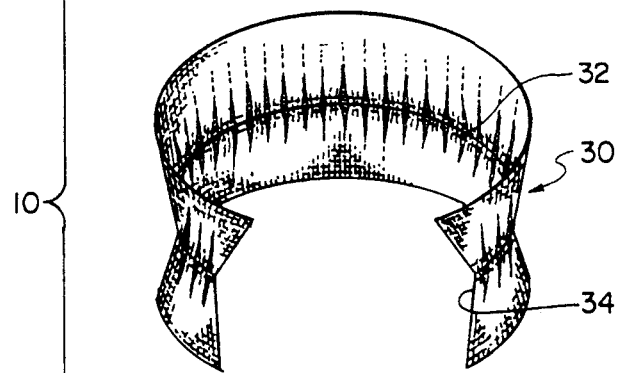
Figure 2C:
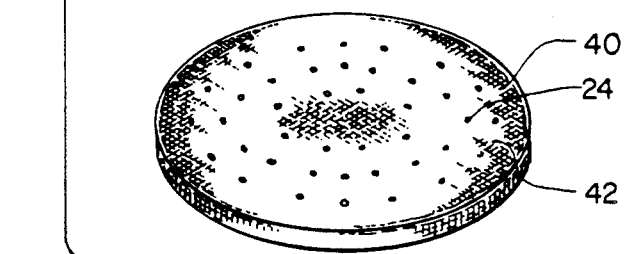

FIGS. 2a through 2c illustrate the basic components of the self-covering pet bed.

FIG. 2a. Illustrates the top (20) which consists of multiple ply quilted fabric (22) and creates a dome-like shape as the animal turns to lay down so that the top

(20) is positioned over the back of the pet. The layers of fabric and quilting material are quilted by means of sewing (24) as appropriate for design size of pet bed.

FIG. 2b. Illustrates the continuous rib (30) that is attached to the top (20) and the pad (40), but is not long enough to completely encircle top (20) and pad (40) so as to allow a space for the animal to enter (34). Rib insert(s) (32) are parallel to the top (20) and pad (40) around the center of the rib (30) so as to cause the rib (30) to spring towards the middle of the sleeping apparatus causing top (20) to position over the cushioning pad (40) so that the edges of the top (20) line up with the edges of the pad (40).

FIG. 2c shows the cushioning pad (40) comprised by quilting a double-multiple ply (42) cushioned base attached to the continuous fabric rib (30).

Figure 2D:
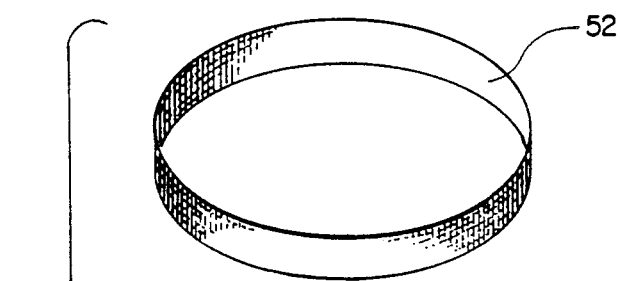
Figure 2E:
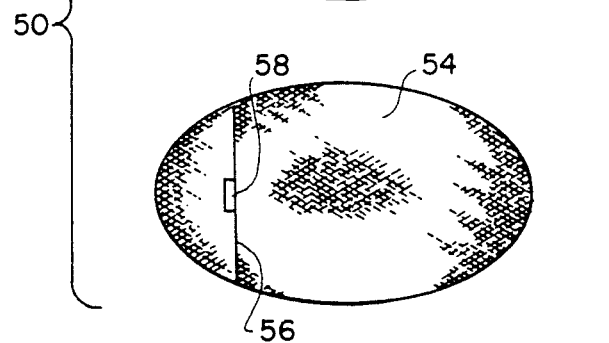

FIG. 2d and 2e shows contruction of optical sham (50).

FIG. 2d. shows how mini-rib (52) is attached to bottom of cushioning pad (40) and sham base (54) to create the space for base insert (60) such as foam rubber or other rigid material.

FIG. 2e illustrates the sham base (54) which is attached to mini rib (52). The opening (56) allows insertion of the base insert (60) into the sham (50). The opening (56) is not a permanent opening but uses a closure devise (58) such as a zipper or snap. This allows base insert (60) to be removed so the self-covering sleeping bag (10) can be machine washed and dryed.

Figure 3A:
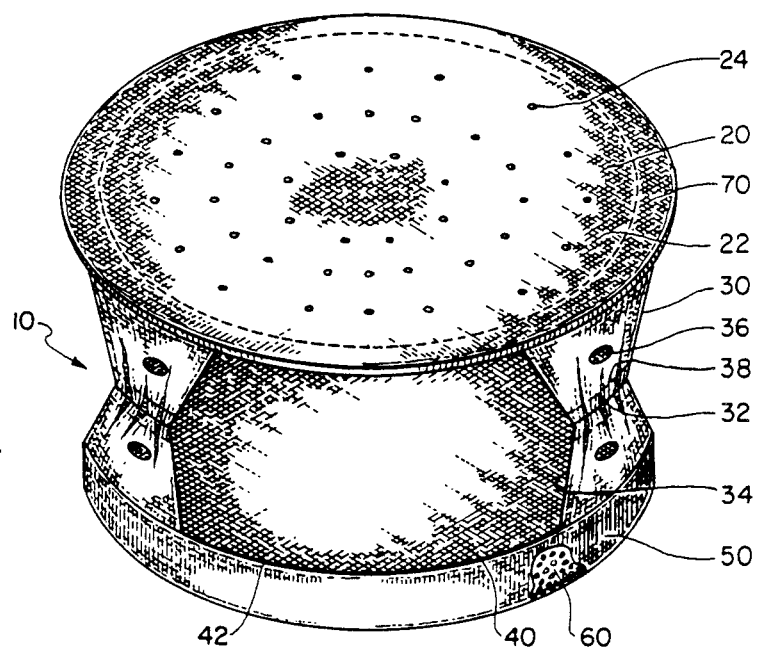
FIG. 3a illustrates the raised front view of the preferred version.
Figure 3B:
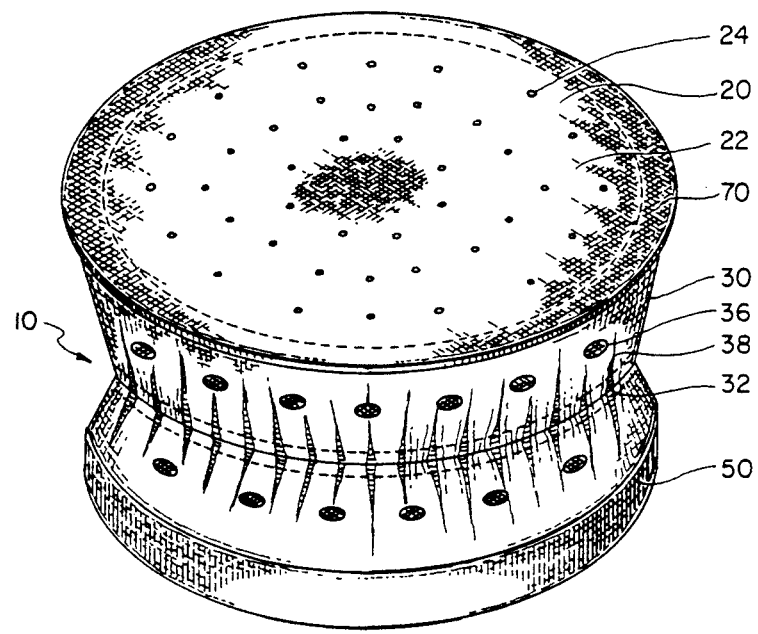
Figure 3C:
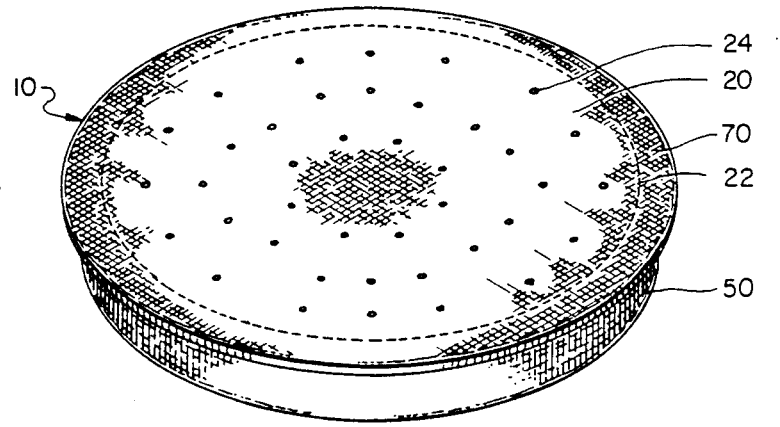
FIG. 3c illustrates FIG. 3a in a relaxed position.

FIGS. 3a to 3c illustrates the preferred version of the self-covering pet bed.

FIG. 3a illustrates front view of self-covering pet bed (10) in an extended position. The preferred version has top framing material such as thick welting (70) attached to the perimeter of the top (20). This makes it easier for the pet to use it's nose to raise the top (20) and enter (34) between the top (20) and pad (40). Also, the top framing (70) attached to the perimeter serves as a stiffening material that causes the top (20) to return to a flattened position over the top (20) when the pet leaves the bed (10). The sham (50) contains base insert (60) which adds rigidity to base.

FIG. 3b illustrates back view of FIG. 3a. Ventilation is added by use of bed vents (36). This are small button hole-type openings radomly spaced on rib (30) near rib insert (32) parallel to the top (20) and the pad (40).

FIG. 3c illustrates preferred version described for FIG. 3a and FIG. 3b in a relaxed position.

CONSTRUCTION AND USE—FIGS. 3a to 3c

The following discussion describes the construction and use of the preferred version of the self-covering pet bed. The preferred version has a finished ratio of approximately $3 \times 2 \times 1$ (top length × top width × rib height). The actual size will vary to fit the pet.

The top (20) is formed by layering outer fabric, approx. $\frac{1}{4}$" filling material such as polyester and inner fabric so as to form a multiple ply fabric (22) similar to a bedding quilt. The top (20) may be shaped by the addition of darts or strips of fabric to cause a slight cupping towards the center of the preferred oval shaped top; or left flat. The preferred model achieves the cupping by slight gathering around each end. The three layers consisting of fabric, filling material and fabric (22) are quilted by sewing (24) as appropriate for the size of the top (20). The top (20) of the preferred model is constructed larger than the pad (40) so as to allow the top framing (70) material to hang over the perimeter of the base (40).

The top framing material (70) is formed by sewing welting rope and polyester filling material strips within a bias tape made from the outer fabric, so as to form a stiff rope-like framing material (70). This attached around the perimeter of the multiple layer quilted top (20) by sewing.

The rib (30) is formed by using a double layer of unquilted outer fabric and is attached to the top (20) and the base (40) but is not long enough to completely encircle the top (20) and the pad (40) so as to leave a space (34) for the pet to enter the bed (10). The method used for attachment in FIG. 3a is by sewing, but that does not preclude temporary attachments such as the use of closure devises, i.e. zipper.

Further, in constructing the rib (30), the preferred model sews two parallel lines so as to create a casing (38) for the resilient inserts (32). The parallel line stiches are sewn about $\frac{1}{4}$" from each other and are placed around the center of the (30) as illustrated in FIG. 3b. An resilient insert (32) is inserted through the casing (38) and fastened so as to create a gathering of the rib (30). This causes the top (20) to position over the pad (40) when in a relaxed position. Other methods of construction could include a casing material, a permanent gathering using elastic or non-elastic thread, or material which is elasticized by manufacturer.

The rib (30) is attached to pad (40) as described above. The pad (40) in the preferred version consists of outer fabric, double layers of multilayer polyester filling, and outer fabric quilted (42) by sewing, but that does not preclude temporary attachments such as the use of closure devises, i.e. zipper.

The preferred version uses approximately 2" mini-rib (52) to construct sham (50) for insertion of a 2" thick foam rubber pad as a base insert (60) which is not shown. However, the sham (50) can be constructed without the use of the mini-rib (52) allowing for a base insert such as wood or heavy gauge plastic.

Pet(s) enter the self-covering pet bed (10) by using their nose to wedge between the the top (20) and the pad (40). As the pet enters the bed (10), the ribs (30) raise by the entering action of the pet. The flexible multilayer top (20) adjust over the pet as the pet positions itself to lay down thereby covering the pet.

When the pet exists, the holding action of the rib inserts (32), and the top framing material (70) readies the self-covering pet bed (10) for its next use. SUMMARY, RAMIFICATIONS AND SCOPE Accordingly, the reader will see that the self-covering pet bed allows the pet to rest either covered or on top of the sleeping devise. It provides a place that the pet can identify as his own and is attractive and compact enough to be placed in the family living areas. Furthermore, the self-covering pet bed has additional advantages in that:

It can be used as a travel bed for the pet.
It can be washed frequently and easily.
There are no parts to scuff furniture or walls
Owners can maintain lower temperatures in the home at night or while at work without concern about the pets comfort.
It appears to be a traditional pet bed and is an attractive addition to any room.
It lets the pet determine its own comfort needs; to sleep on top or be covered.
It satisfies denning instincts of the pet.

Although the description above contains many specificities, these should not be construed as limiting the scope of the invention but as merely providing illustrations of some of the presently preferred embodiments of this invention. For example, the basic shapes could be square, rectangular, triangular, etc. rather than oval; the pad could be permanently attached to a rigid base; the rib could be temporarily attached to top or pad by using a closure such as a zipper, etc. Stiffened materials could be used to create the telescoping effect of the ribs and flattening features of the top. Thus the scope of the invention should be determined by the appended claims and their legal equivalents, rather than by the examples given.

We claim:

1. A dual use sleeping apparatus for pets, comprising:
   a. a top which alternately acts as a mat and as a direct covering for pets;
   b. a cushioned pad which supports the top whereby the perimeter of the top is contiguous to the perimeter of the pad;
   c. flexible ribs connecting the top and cushioned pad with space for pet's entry;
   the ribs connecting the top and cushioned pad with space for pet's entry contain inserts with resilient properties which cause the ribs to pull towards the center of the pad causing the perimeter of the top to be substantially contiguous to the perimeter of the pad.

* * * * *